(12) United States Patent
Wuersch et al.

(10) Patent No.: US 7,482,968 B2
(45) Date of Patent: Jan. 27, 2009

(54) DETECTOR FOR EMBEDDED ELONGATE OBJECTS

(75) Inventors: Christoph Wuersch, Werdenberg (CH); Torsten Gogolla, Schaan (LI); Andreas Winter, Rankweil (AT); Wilfried Kaneider, Feldkirch-Tosters (AT); Harald Schmitzer, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 233 days.

(21) Appl. No.: 11/405,878

(22) Filed: Apr. 17, 2006

(65) Prior Publication Data

US 2006/0238401 A1    Oct. 26, 2006

(30) Foreign Application Priority Data

Apr. 26, 2005    (DE)    ........................ 10 2005 019 239

(51) Int. Cl.
    *G01S 13/00*    (2006.01)
(52) U.S. Cl. ........................................................ 342/22
(58) Field of Classification Search ................ 324/323, 324/326, 329, 332, 334, 337, 341, 344, 642; 342/22, 27, 28, 59, 85, 94, 95, 97, 124, 136, 342/137, 175, 176–186, 195; 367/88, 95, 367/98, 101, 105, 908
    See application file for complete search history.

(56) References Cited

U.S. PATENT DOCUMENTS

| 4,103,441 | A | * | 8/1978 | Flippin | ........................ 37/363 |
|---|---|---|---|---|---|
| 5,248,975 | A | * | 9/1993 | Schutz | ........................ 342/21 |
| 5,296,807 | A | * | 3/1994 | Kousek et al. | .............. 324/235 |
| 5,457,394 | A | * | 10/1995 | McEwan | ..................... 324/642 |
| 5,541,605 | A | * | 7/1996 | Heger | ........................... 342/85 |
| 5,592,170 | A | * | 1/1997 | Price et al. | .................... 342/22 |
| 5,680,048 | A | * | 10/1997 | Wollny | ....................... 324/329 |
| 6,541,965 | B1 | | 4/2003 | Binder | |
| 6,600,441 | B2 | * | 7/2003 | Liedtke et al. | ................ 342/22 |
| 6,894,510 | B2 | | 5/2005 | Schmidt | |
| 7,180,440 | B2 | | 2/2007 | Schmidt | |
| 2002/0094789 | A1 | * | 7/2002 | Harano | ........................ 455/90 |

FOREIGN PATENT DOCUMENTS

| DE | 10239432 A1 | 4/2004 |
|---|---|---|
| WO | WO02063334 A2 | 8/2002 |
| WO | WO02063343 A1 | 8/2002 |

OTHER PUBLICATIONS

"Forensic GPR: finite-difference simulations of responses from buried human remains", William S. Hammon III et al., Journal of Applied Geophysics vol. 45 (2000) pp. 171-186.*

(Continued)

*Primary Examiner*—Thomas H Tarcza
*Assistant Examiner*—Peter M Bythrow
(74) *Attorney, Agent, or Firm*—Abelman, Frayne & Schwab (57) ABSTRACT

A detector (1) for detecting embedded elongate objects (5) has an evaluating unit (6), a computing device (7), an output device (8), and a handheld measuring head (9) which can be moved over a surface (F) and which has a path a detector (10) and a transmitting-receiving unit (11a) with an antenna (12a). At least two antennae (12a, 12b) are spaced apart from one another along the surface (F), and the distance (A) therebetween, measured over the surface (F), ranges between 5 cm and 50 cm.

26 Claims, 6 Drawing Sheets

OTHER PUBLICATIONS

"Mine detection with a multi-channel stepped-frequency ground penetrating radar", Marshall Bradley et al., Part of the SPIE Conference on Detection and Remediation Technologies for Mines and Minelike Targets IV (Apr. 1999) pp. 953-960.*

* cited by examiner

$$C(i,j) = \sum_{m=0}^{(Ma-1)} \sum_{n=0}^{(Na-1)} A(m,n) \cdot conj(B(m+i, n+j))$$

$0 \leq i < Ma + Mb - 1$ and $0 \leq j < Na + Nb - 1$

DETECTOR FOR EMBEDDED ELONGATE OBJECTS

BACKGROUND OF THE INVENTION

1. Field of the Invention

The invention relates to a detector of embedded elongate objects, particularly of plastic tubular conduits embedded in masonry, and to an associated measurement method.

2. Description of the Prior Art

The detection of embedded elongate objects, i.e., objects extending substantially along one dimension, plays an important role in the constructional industry for detecting iron reinforcements, metal pipes, electric lines or plastic conduit. Embedded elongate objects are detected and identified by the change in impedance of an impressed magnetic near-field, e.g., according to U.S. Pat. No. 6,541,965, by the change in impedance of an impressed electric near-field according to DE 102 39 432, or electromagnetically by a radar according to U.S. Pat. No. 5,541,605. Since the two last-mentioned measurement principles respond physically particularly to the change in the dielectric constant, detection of the plastic tubular conduits in masonry, which have a dielectric permittivity of about 4 to 8 or approximately 4.3 in the frequency range of 1-10 GHz, presents a challenge with respect to the measurement technique. Detection of plastic tubular conduit in masonry is made more difficult by the cavities which are introduced in masonry for thermal insulation in bricks because their dimensions and position are similar to those of plastic tubular conduits.

U.S. Pat. No. 5,296,807 discloses a handheld detector for embedded elongate objects and has a handheld measuring head that can be moved over the surface for measuring an impressed magnetic near-field, a path detector, and a spatially separate, image-generating evaluating unit having a signal-transmitting connection to the measuring head.

Further, according to U.S. Pat. No. 6,600,441, in a radar detector for embedded elongate objects, several pairs of antenna are provided at a predetermined distance from one another. A signal processor selects elongate objects from the separate radar measurement signals of the antennae using correlation functions, and determines their length in the plane. Further, a radar detector with a patch antenna is disclosed in Publication WO 02063334.

In addition, modern methods of computer-assisted signal processing particularly of time-based 3D measurement data, which are not, per se, the subject of the present invention, are known to a person skilled in the art.

SUMMARY OF THE INVENTION

It is an object of the invention to provide a detector of embedded elongate objects which is suitable particularly for detecting plastic conduits embedded in masonry.

Another object of the present invention is a method of detecting plastic conduits embedded in masonry.

These and other objects of the present invention, which will become apparent hereinafter, are achieved by providing a detector for detecting embedded elongate objects and having an evaluating unit with computing means and an output device, and a handheld measuring head which can be moved over a surface and which has a path a detector and a transmitting-receiving unit with at least two antennae that are spaced from one another along a surface. The distance between two antennae, measured over the surface, ranges between 5 cm and 50 cm, optimally 15 cm, and, thus, corresponds to a standard height of masonry bricks. In this regard, either the evaluating unit can form an integral constructional unit with the measuring head, or the evaluating unit and the measuring head can be formed as two separate constructional units, having, at least occasionally, a data-transmitting connection with one another. The invention includes both possibilities.

Due to the distance between two antennae, which corresponds to a standard height of masonry bricks and which also defines the spacing in rows of adjacent masonry bricks in the wall bond of a masonry structure to be examined for embedded elongate objects, the measurement signals measured by the two spaced antennae acquire the embedded objects of different masonry bricks. Since these bricks are usually arranged so as to be offset horizontally in the wall bond and their cavities, which are possibly integrated periodically, extend vertically, the positional offset for each cavity in two bricks arranged vertically one above the other is randomly distributed, whereas vertically embedded elongate objects such as plastic conduit usually extend over a plurality of rows of brick. Therefore, it is possible to distinguish between cavities in brick and embedded elongate objects after scanning along a scanning direction in the surface of a region to be analyzed by calculating the two measurement signals from different rows of brick because the relevant signal components of the cavities do not accumulate randomly in like phase and, therefore, become weaker with respect to the signal components of the embedded elongate objects.

The transmitting-receiving unit is advantageously formed as a radar transmitting-receiving unit and, as a further advantage, with a relative bandwidth in the range from 0.5 to 1.0 in a frequency range between 500 MHz and 10 GHz. Thereby, objects embedded in constructional materials can be reliably detected to a sufficient depth. By selecting the wavelength of the radar and its bandwidth in this way, the cavities of the bricks and of the plastic conduits can be resolved.

The two antennae are advantageously formed as monostatic, broadband dipole antennae (e.g., patch antennae) and, as a further advantage, with identically oriented polarization directions so that a maximum sensitivity is achieved for elongate objects extending perpendicular to the scanning direction.

In addition, at least one additional sensor of a different type is advantageously arranged in the measuring head so that the detected object can be identified by computing means using two different measurement methods so that the identification is more reliable.

The additional sensor advantageously extends symmetrically around exactly two antennae so that the inductive sensor is arranged in the middle position of the two antennae with respect to its measurement position.

Alternatively, the additional sensor advantageously extends symmetrically around exactly one antenna in each instance so that they are nested coaxially one inside the other with respect to the same measurement position.

The additional sensor is advantageously formed as an inductive sensor and, as a further advantage, is formed of an exciter coil and two differentially connected receiver coils or a plurality of fluxgate sensors or magnetoresistive sensors as receivers. Thereby, cavities or plastic conduit can be detected by making use of the fact that bricks are relatively highly magnetic compared to concrete because they contain burnt clay which is normally iron-containing magnetite. These iron components are converted to magnetic magnetite when fired.

The inductive sensor is advantageously formed as a ferrite cross with two different flux paths in the scanning direction and a direction perpendicular thereto, respectively, so that a 3D induction measurement signal is obtained.

At least two transmitting-receiving units are advantageously provided, with an exactly one antenna being associated with each of them, so that switching means between the antennae can be dispensed with and a modular method of construction is possible.

The measuring head is advantageously formed with collapsible legs that can pivot by 180°. The two transmitting-receiving units are arranged on different legs so that the structural length is shortened, when folded together.

The two transmitting-receiving units are advantageously arranged so that they can be displaced along the legs, and the distance between the two antennae can be adapted to the masonry to be examined, particularly to the spacing in the row of bricks.

In an advantageous manner, at least one wheel which can roll along the surface to be examined is arranged at each leg. Further, a total of exactly three wheels can advantageously be arranged so as to be offset relative to one another along the pivoting axis so that a three-point support is achieved without tipping, when the legs are extended and the three wheels are nested one inside the other, when folded together.

At least one wheel per leg is advantageously connected to the path a detector, e.g., an incremental path transmitter or optical correlation sensor, so that, in addition to the change in position of the measuring head, a change of its attitude on the surface can also be detected.

The associated measurement method for detecting embedded elongate objects in a surface of an area to be examined includes a first step which is repeated multiple times and in which a detector senses the change of a position of the measuring head displaceable along a scanning direction over the surface, and a separate measurement signal (A scan) is measured of each of at least two antennae whose respective positions are associated with separate measurement signals. In a second step, separate measurement variables are determined by the computing means from the at least two separate measurement signals, respectively. The separate measurement variables contain possible embedded objects that can be identified in the separate measurement signals. In a third step, these at least two separate measurement variables are calculated together by the computing means to form a correlation measurement variable to which a middle position is assigned.

In the second step, the separate measurement signal is advantageously treated as identical to the separate measurement variable, at least partially, so that with high-quality raw data, additional computationally intensive signal processing methods can be eliminated.

Advantageously, in the second step, the computing means carries out, at least partially, conventional signal processing methods such as preprocessing (scaling, filtering, resampling, elimination of outliers, interpolation), background subtraction (average or median regression), compensation of attenuation loss (depth-dependent amplification), logarithmization (logarithmic scaling), lateral focusing (migration: inclusion of marginal values; SAFT: Synthetic Aperture Focusing Technique), depth focusing (Hilbert transformation, Euler deconvolution, pulse compression), so that the quality of the separate measurement variable is increased.

Advantageously, in the third step, the computing means uses the following calculation variants separately or in combination to implement the (one-dimensional or two-dimensional) spatial correlation of the two separate measurement variables to form a correlation measurement variable:
  a) the separate measurement variables are correlated to form a correlation measurement variable by an AND operation or by multiplication of the at least two separate measurement variables;
  b) the separate measurement variables are correlated to form a correlation measurement variable of cross-correlation or cross-variance of the at least two separate measurement variables;
  c) a set-theoretical intersection set (AND operation by pixel) of the objects (after the object detection based on an separate measurement variable) which are discretely detected spatially (surface position and depth) by pixel per separate measurement variable is formed from the at least two separate measurement variables;
  d) a superimposed probability distribution (multiplication of separate probabilities) of the objects (after the object detection based on a separate measurement variable), which are detected spatially (surface position and depth) and fuzzily per separate measurement variable is formed from the at least two separate measurement variables.

Advantageously, in another step, the correlation measurement variable and an additional measurement variable, which was additionally determined in the first step by the additional sensor as an additional measurement signal and processed in the second step to form an additional measurement variable, are advantageously combined by the computing means to form a combined measurement variable so that the redundancy of the measurement variables is increased, and the characterization of a detected embedded object is, therefore, made more reliable.

Advantageously, with an additional measurement signal which is measured by an inductive sensor, the supply frequency of a main power supply is advantageously detected by the computing means and is processed, together with the additional measurement variable so that electric current-carrying conductors or lines can be reliably detected.

In an advantageous manner, a plurality of separate measurement variables, correlation measurement variables and/or combination measurement variables are calculated together with their positions by the computing means (detection and grouping of extremes) and, further advantageously, are compared to predetermined object parameters (measurement value thresholds, dimension thresholds, e.g., at least 2 cm, plausibility test) and processed to form an object variable which with position and depth are associated, so that embedded objects are identified in three dimensions. Accordingly, depending on the user's selection, this process step is possible before and after the calculation of the combination variable.

Advantageously, in a further step, depending on the user's selection, the correlation measurement variable, the combination measurement variable or the object variable is calculated with the position and/or depth by the computing means to form a variable image (A scan, B scan, C scan, or D scan), which is displayed on a graphic display device of the evaluation unit.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
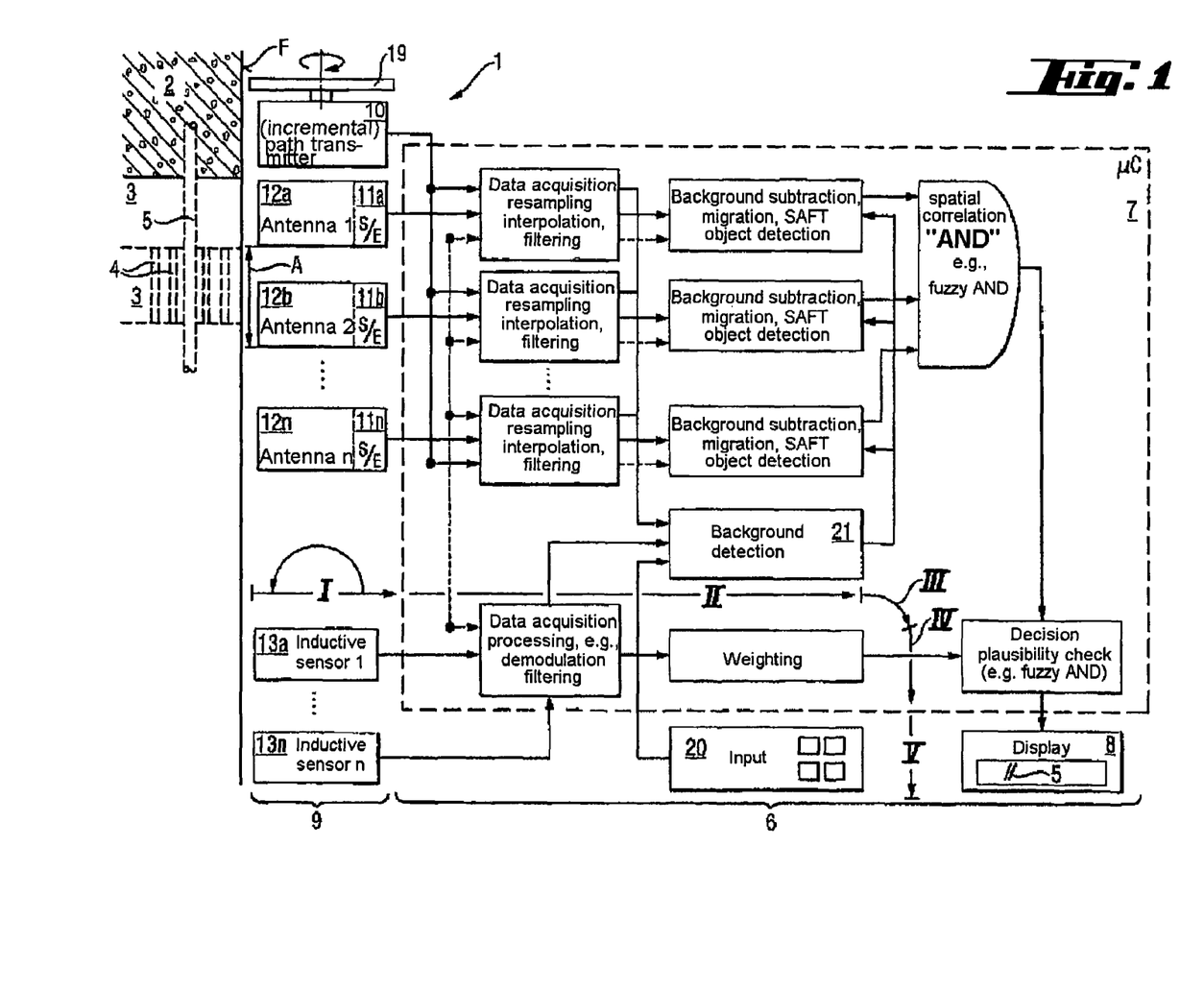
FIG. 1 shows a flowchart of a detector according to the present invention.

According to FIG. 1, a schematically shown detector 1 for elongate objects 5 in the form of plastic tubular conduits, which are embedded in a masonry structure 2 with bricks 3 having cavities 4, has an evaluating unit 6 with computing means 7 in form of a microcontroller µC, an output device 8 in form of an image-generating display, and an input device 20 in the form buttons, and a measuring head 9 which is movable over a surface F (perpendicular to the drawing plane). The measuring head 9 has a path detector 10 in form of an incremental path transmitter 10 that is connected to a wheel 19 and a plurality of transmitting-receiving units 11a, 11b, 11n with a plurality of antennae 12a, 12b . . . 12n which are spaced apart over the surface F. The distance A between two antennae 12a, 12b measured along the surface F is 15 cm and, therefore, corresponds to a standard height of masonry bricks 3. The measuring head 9 and the evaluating unit 6, which together form a handheld, integral constructional unit, are connected in a data-transmitting manner. The plurality of transmitting-receiving units 11a, 11b, 11n are formed as radar transmitting-receiving units with a relative bandwidth of 1.0 in the frequency range between 500 MHz and 10 GHz and are associated in each instance with exactly one antenna 12a, 12b, 12n. A plurality of additional sensors 13a . . . 13n of a different type which are formed as inductive sensors are provided in addition.

Figure 2A:
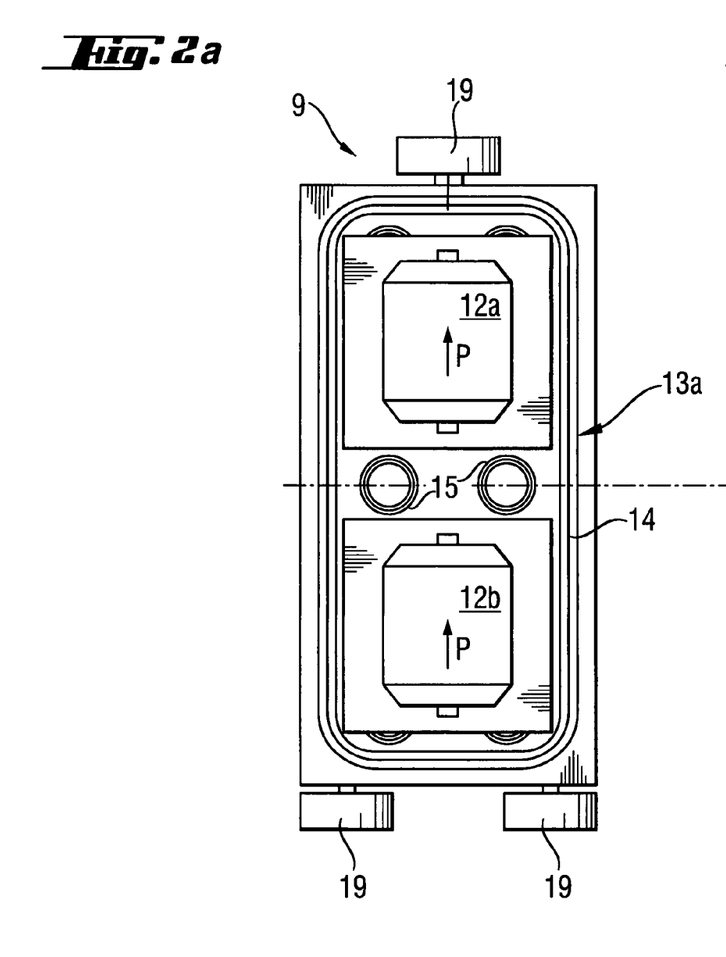
FIG. 2a and FIG. 2b show schematic views of a measuring head of the detector according to the present invention.
Figure 2B:
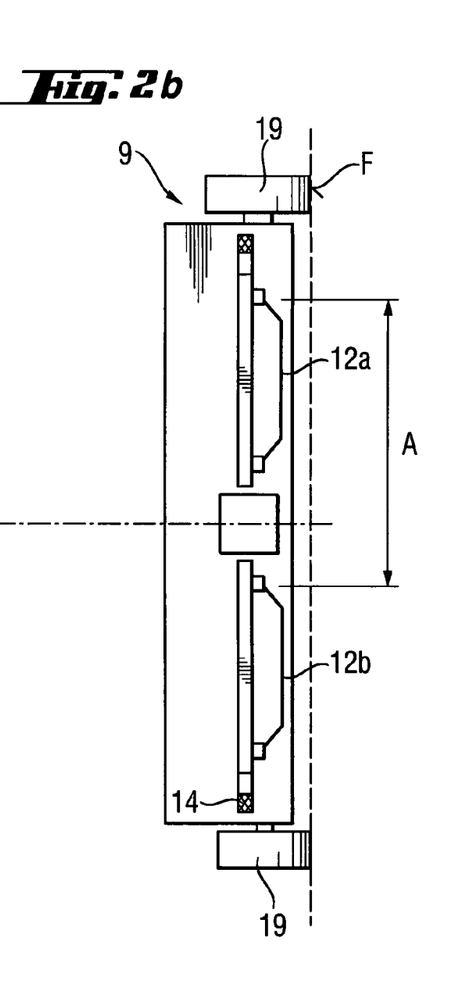

According to FIGS. 2a and 2b, a measuring head 9, which is shown in plan view and in schematic longitudinal view, has exactly three wheels 19 which can roll along the surface F to be examined, and exactly two antennae 12a, 12b which are spaced from one another by distance A along the surface F. Each antenna 12a, 12b is formed as a monostatic patch antenna with identically oriented polarization direction P. An additional sensor 13a of a different type in the form of an inductive sensor is arranged symmetrically around the two antennae 12a, 12b and has an exciter coil 14 and a plurality of separate differentially connected receiver coils 15.

Figure 3A:
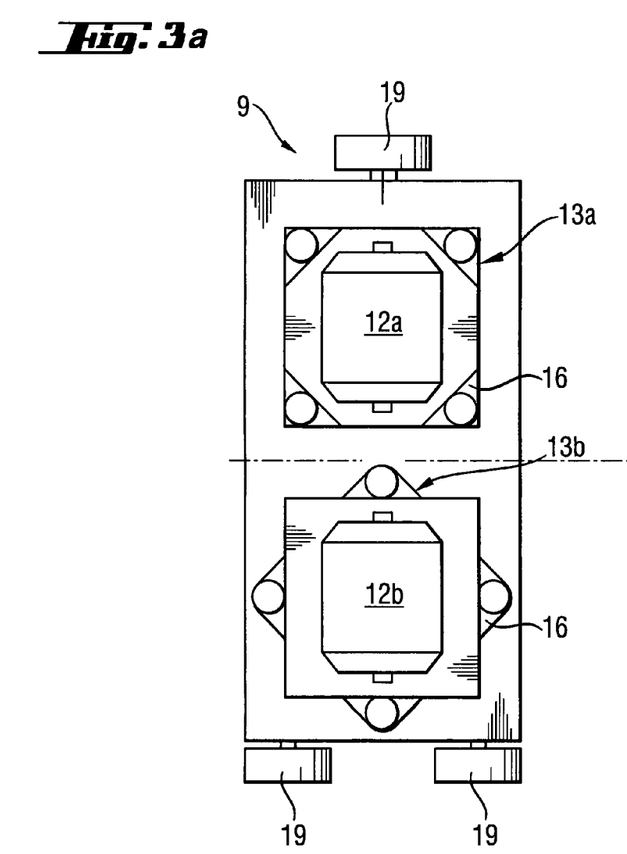
FIG. 3a and FIG. 3b shows an alternate embodiment of a measuring head of a detector according to the present invention.
Figure 3B:
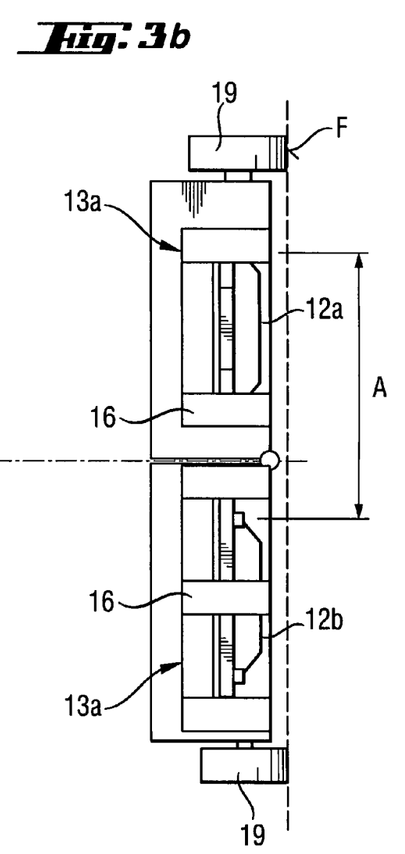

According to FIG. 3a, FIG. 3b, an alternate measuring head 9, which is likewise shown in plan view and schematic longitudinal view, has exactly three wheels 19 which can roll on the surface F to be examined and exactly two antennae 12a, 12b which are spaced from one another by a distance A along the surface F. An additional sensor 13a, 13b of a different type in form of an inductive sensor is associated with each antenna 12a, 12b, its ferrite cross 16 extending symmetrically around exactly one antenna 12a, 12b in each instance. In addition, the sensors 13a, 13b are rotatable relative to one another by 45° over the surface F.

Figure 4:
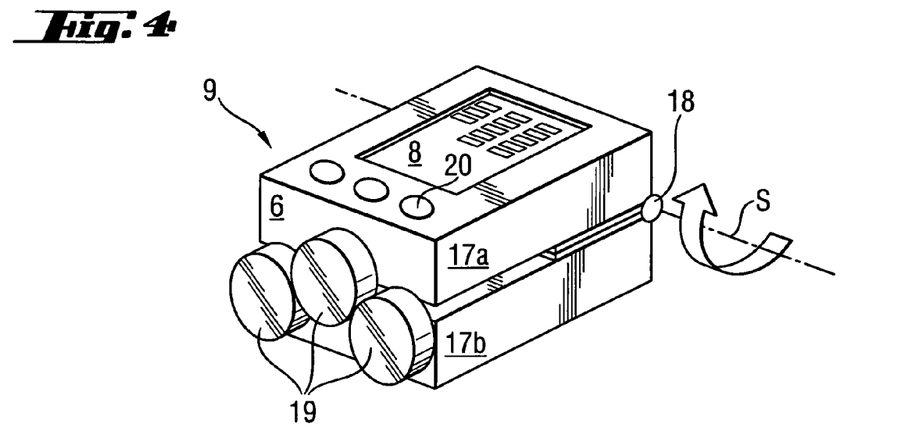
FIG. 4 and FIG. 5 show a schematic view of a detector with a separate, collapsible measuring head.
Figure 5:
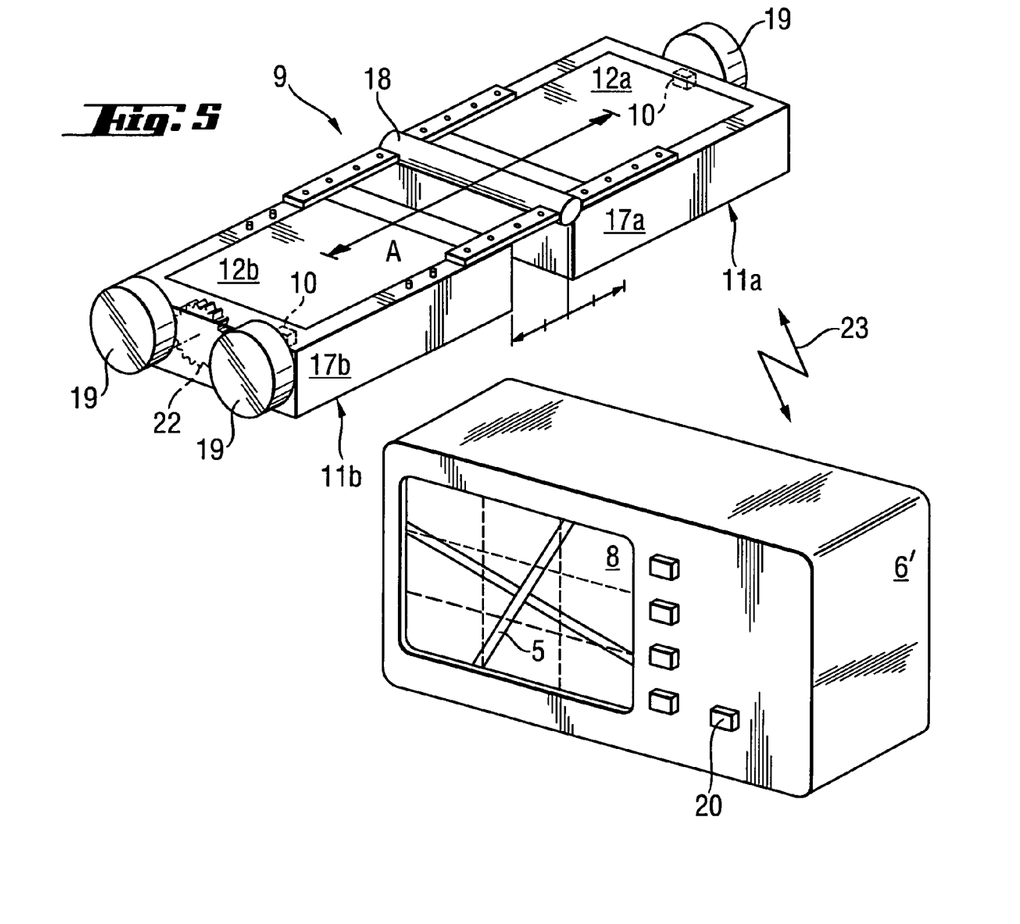

According to FIG. 4 and FIG. 5, a separate handheld measuring head 9 is formed with two collapsible legs 17a, 17b which are pivotable relative to one another by 180° around a pivot axis S.

The two antennae 12a, 12b are arranged on different legs 17a, 17b. The pivoting hinge 18 can be fixed at an offset to the two inner transmitting-receiving units 11a, 11b with the antennae 12a, 12b, so that the distance A between the antennae 12a, 12b can be changed. Exactly one wheel 19 is arranged at leg 17a and exactly two wheels 19 are arranged at leg 17b so as to project over the edge in each instance. When the legs 17a, 17b are folded together, these wheels 19 nest one inside the other so as to be offset along the pivot axis S. One wheel 19 per leg 17a, 17b is connected to the path a detector 10. The two wheels 19 of the leg 17b are coupled with one another for joint rotation with each other by an internal toothed wheel 22. A leg 17a of the handheld measuring head 9 is formed as an integrated evaluating unit 6 and has an integrated output device 8 in form of an image-generating display, and an integrated input device 20 in form of buttons. Further, the measuring head 9 is connected to an evaluating unit 6' by suitable wireless (radio, IR) bi-directional data transmission 23. The evaluating unit 6' is formed as a separate constructional unit and has the output device 8 in form of an image-generating display for the suspected embedded elongate objects 5 and the input device 20 in form of buttons.

Figure 6:
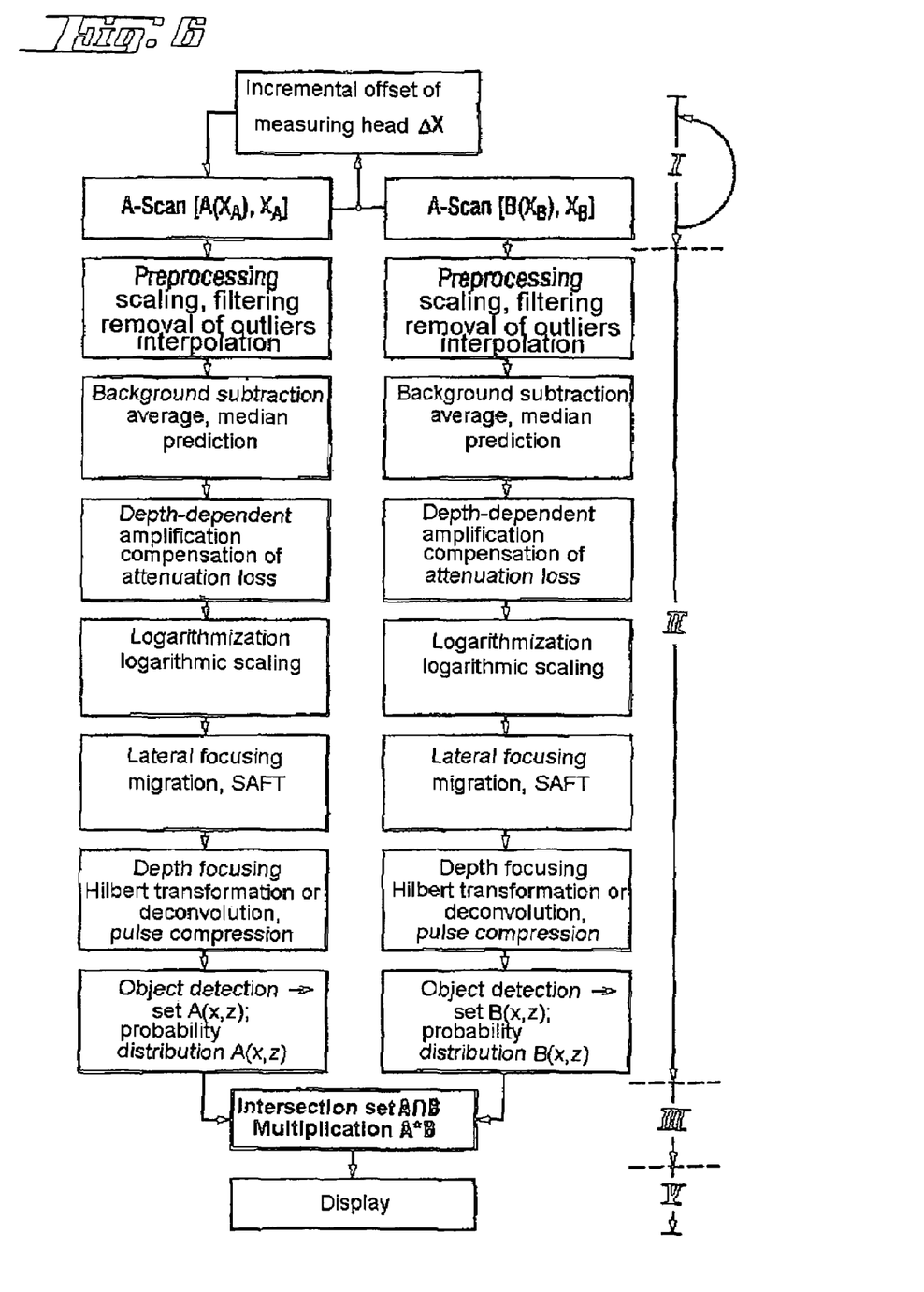
FIG. 6 shows a flowchart of a measurement method according to the present invention.

In the associated measurement method, according to FIG. 6, in a first step I which is repeated multiple times, a detector 1 senses the change in position $\Delta x$ of a measuring head 9 which is displaceable in a scanning direction along the surface F and, in the form of an A scan, and acquires an separate measurement signal $A(x_A)$, $B(x_B)$ of two antennae 12a, 12b, respectively, the positions $x_A$, $x_B$ of the antennae 12a, 12b being associated with the respective separate measurement signal $A(x_A)$, $B(x_B)$.

In a second step II, the computing means determines a separate measurement variable $A[A(x_A), x_A]$, $B[B(x_B), x_B]$ from the two separate measurement signals $A(x_A)$, $B(x_B)$ for each position $x_A$, $x_B$ by using a predetermined A-scan algorithm. The separate measurement variables $A[A(x_A), x_A]$, $B[B(x_B), x_B]$ contains possible embedded objects which are identifiable in the separate measurement signal $A(x_A)$, $B(x_B)$. Also in the second step II, conventional signal processing methods are carried out by the computing means selectively and separately (correspondingly automatic background detection, targeted mode selection entered by the user) in the following sequence: preprocessing, background subtraction, compensation of an attenuation loss, logarithmization, lateral focusing, and depth focusing.

Subsequently, for purposes of object detection, a plurality of separate measurement variables $A[A(x_A), x_A]$, $B[B(x_B), x_B]$ are computed with their positions $x_A$, $x_B$ by the computing means to form an object variable $A(x, z)$, $B(x, z)$ in each instance at positions x and depths z, either in the form of a Boolean 3D set or in the form of 3D probability distributions containing fuzzy object probabilities.

In a third step III, these two object variables $A(x, z)$, $B(x, z)$ are calculated together by the computing means to form a correlation measurement variable $A \cap B$ or $A*B$ either in that the 3D intersection set $A \cap B$ is determined by forming the average set from the 3D sets, or in that a superimposed 3D probability distribution is determined by multiplication $A*B$ of the two separate 3D probability distributions. In a fifth step V directly thereafter, the computing means calculates the correlation measurement variable $A \cap B$ or $A*B$ with the position x and depth z to form a selectable variable image which is displayed by a graphic output device of the evaluating unit.

Figure 7:
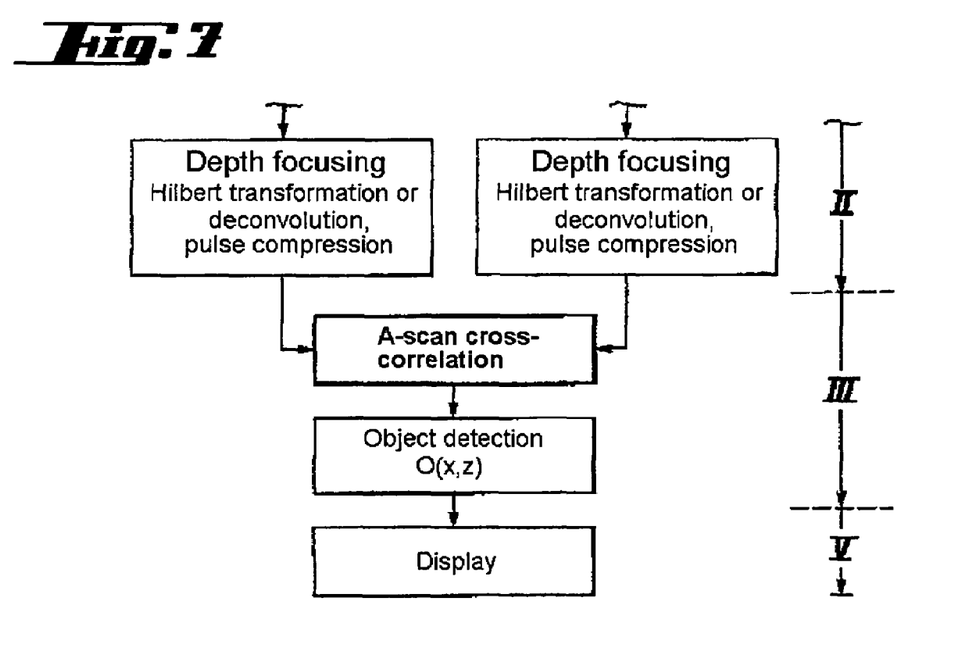
FIG. 7 shows a flowchart of an alternate measurement method according to the present invention.

In an alternate measurement method, according to FIG. 7, which is modified only in part and shown only in part with respect to FIG. 6, in the second step II subsequent to the signal processing in step III that concludes with the depth focusing, a discrete two-dimensional A-scan cross-correlation of the two separate measurement variables $A[A(x_A), x_A]$, $B[B(x_B), x_B]$ is carried out for each position to form a common correlation variable before object detection is carried out therein, and the common object variable $O(x, z)$ is calculated. In the fifth step V, this common object variable $O(x, z)$ is computed with the position x and depth z to form the image which is displayed on a graphic output device of the evaluating unit.

Figure 8:
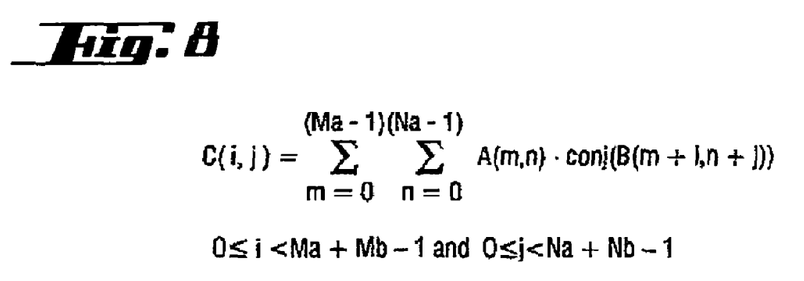
FIG. 8 shows equations of a discrete two-dimensional cross-correlation.

According to FIG. 8, in the signal processing by discrete two-dimensional cross-correlation, the correlation measurement variable is generally determined in the form of a correlation matrix $C(i, j)$, where Ma and Na are the dimensions of the matrix A, Mb and Nb are the dimensions of matrix B, and i, j, m, n are consecutive indices.

According to the measurement method shown in FIG. 1, in a fourth step IV immediately following the third step III the computing means carries out a decision about whether or not an object has been detected at a position. In so doing, the correlation measurement variable, which is determined by a discrete spatial correlation AND, and an additional measurement variable are included in a weighted manner in the plausibility check and combined to form a combination measurement variable. This additional measurement variable was additionally determined as an additional measurement signal in the first step I by a plurality of sensors 13a, 13n formed as inductive sensors, and was processed in the second step II to form an additional measurement variable, wherein a power supply frequency (50 Hz or 60 Hz) was also detected by demodulation. When the combination measurement variable exceeds a determined threshold value, an embedded object 5 is suspected at this position and this is shown graphically on the display. All of the separate measurement variables and the additional measurement variable are also fed to a background detection device 21 which is controlled automatically or by the user by with input device 20 and which, in either case, controls the separate partial steps of the signal processing of the separate measurement signals.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A detector for detecting embedded elongate objects (5), comprising an evaluating unit (6) having computing means (7) and an output device (8); a handheld measuring head (9) displaceable over a surface (F) and including a path detector (10), a transmitting-receiving unit (11a) with an antenna (12a); and at least one further antenna (12b) spaced from the antenna (12a) of the transmitting-receiving unit (11a) along the surface (F), by a distance (A) lying in a range from 5 cm and 50 cm;
wherein the detector performs a measurement method of detecting the embedded elongate objects (5) in the surface (F) of a to-be-examined area, including:
a first step (I) which is repeated multiple times and in which, a detector (1) senses a change in a position ($\Delta$x) of the measuring head (9) displaceable along a scanning direction over the to-be-examined surface (F), and receives separate measurement signals $(A(x_A) B(x_B))$ from the at least two antennae (12a, 12b), respectively, whose positions $(x_A, x_B)$ are associated with the separate measurement signals $(A(x_A) B(x_B))$;
a second step (II) performed by the computing means (7) in which separate measurement variables $(A[A(x_A), x_A], B[B(x_B), x_B])$, which contain possible embedded objects (5) that can be identified in the separate measurement signals $(A(x_A) B(x_B))$, are determined from the separate measurement signals $(A(x_A) B(x_B))$ using a predetermined A-scan algorithm, respectively; and
a third step (III) in which the at least two separate measurement variables $(A[A(x_A), x_A], B[B(x_B), x_B])$ are calculated together by the computing means (7) to form a correlation measurement variable.

2. A detector according to claim 1, wherein the transmitting-receiving unit (11a) is formed as a radar transmitting-receiving unit.

3. A detector according to claim 2, wherein the transmitting-receiving unit (11a) has a relative bandwidth in the range of 0.5 to 1.0 in the frequency range between 500 MHz and 10 GHz.

4. A detector according to claim 2, wherein the two antennae (12a, 12b) are formed as monostatic, broadband dipole antennae.

5. A detector according to claim 4, wherein the two antennae have an identically oriented polarization direction (P).

6. A detector according to claim 1, wherein the measuring head (9) includes at least one additional sensor (13a) of a different type.

7. A detector according to claim 6, wherein the additional sensor (13a) extends symmetrically around exactly two antennae (12a, 12b).

8. A detector according to claim 6, wherein the measuring head (9) includes a further additional sensor, the two additional sensors (13a, 13b) extending symmetrically around exactly one antenna (12a, 12b) in each instance.

9. A detector according to claim 6, wherein the at least one additional sensor (13a) is an inductive sensor.

10. A detector according to claim 9, wherein the inductive sensor is formed as a ferrite cross (16) with two different flux paths, in a scanning direction and a direction perpendicular thereto, respectively.

11. A detector according to claim 1, wherein the measuring head (9) includes at least one further transmitting-receiving units (11a, 11b), and wherein the at least one further antenna (12b) is associated with the at least one further transmitting-receiving unit.

12. A detector according to claim 11, wherein the measuring head (9) is formed with collapsible legs (17a, 17b) pivotable by 180°, wherein the two transmitting-receiving units (11a, 11b) with their respective antennae (12a, 12b) are arranged on different legs (17a, 17b).

13. A detector according to claim 12, wherein the two antennae (12a, 12b) are arranged as to be displaceable relative to one another along the legs (17a, 17b).

14. A detector according to claim 13, wherein at least one wheel (19) rollable along the surface (F) to be examined is arranged at each leg (17a, 17b).

15. A detector according to claim 14, wherein a total of exactly three wheels (19) are arranged so as to be offset relative to one another along the pivot axis (S).

16. A detector according to claim 14, wherein at least one wheel (19) per leg (17a, 17b) is connected to the path detector (10).

17. A measurement method of detecting embedded elongate objects (5) in a surface (F) of a to-be-examined area, comprising a first step (I) which is repeated multiple times and in which, a detector (1) senses a change in a position (Δx) of a measuring head (9) displaceable along a scanning direction over the to-be-examined surface (F), and receives separate measurement signals ($A(x_A)$ $B(x_B)$) from at least two antennae (12a, 12b), respectively, whose positions ($x_A$, $x_B$) are associated with the separate measurement signals ($A(x_A)$ $B(x_B)$); a second step (II) performed by computing means (7) in which separate measurement variables ($A[A(x_A), x_A]$, $B[B(x_B), x_B]$), which contain possible embedded objects (5) that can be identified in the separate measurement signals ($A(x_A)$ $B(x_B)$), are determined from the separate measurement signals ($A(x_A)$ $B(x_B)$) using a predetermined A-scan algorithm, respectively; and a third step (III) in which the at least two separate measurement variables ($A[A(x_A), x_A]$, $B[B(x_B), x_B]$) are calculated together by the computing means (7) to form a correlation measurement variable.

18. A measurement method according to claim 17, wherein the separate measurement signal ($A(x_A)$) is treated as being the separate measurement variable ($A[A(x_A), x_A]$) in the second step (II).

19. A measurement method according to claim 17, wherein the computing means (7) performs conventional signal processing methods in the second step (II).

20. A measurement method according to claim 17, wherein the computing means (7) uses at least one of following calculation variants in the third step (III) to carry out the correlation of the two separate measurement variables ($A[A(x_A), x_A]$, $B[B(x_B), x_B]$) to form a correlation measurement variable:
   a) the at least two separate measurement variables are correlated to form a correlation measurement variable by an AND operation or multiplication;
   b) the at least two separate measurement variables are correlated to form a correlation measurement variable by cross-correlation or cross-variance;
   c) a set-theoretical intersection set is formed from the objects of the at least two separate measurement variables which are discretely detected spatially;
   d) a superimposed probability distribution of the objects of the at least two separate measurement variables which are detected spatially and fuzzily is formed.

21. A measurement method according to claim 17, further comprising a fourth step (IV), in which the correlation measurement variable and an additional measurement variable which was additionally determined in the first step (I) by an additional sensor (13a) as an additional measurement signal and which was processed in the second step (II) to form an additional measurement variable are combined by the computing means (7) to form a combination measurement variable.

22. A measurement method according to claim 21, wherein, in an additional measurement variable, which is measured by an inductive sensor, a supply frequency of a main power supply is detected by the computing means (7) and is processed together with the additional measurement variable.

23. A measurement method according to claim 17, further comprising another step, in which a plurality of correlation measurement variables and/or combination measurement variables are calculated together with their positions ($x_A$, $x_B$) by the computing means (7).

24. A measurement method according to claim 23, wherein the plurality of correlation measurement variables and/or the combination measurement variables are compared to predetermined object parameters, and are processed to form an object variable (O(x, z)) with which a position (x) and depth (z) are associated.

25. A measurement method according to claim 24, comprising a further step (V), in which the object variable (O(x, z)) is calculated with the position (x) and/or depth (z) by the computing means (7) to form a variable image which is displayed, by an output device (8) of an evaluation unit (6).

26. A measurement method according to claim 25, wherein the resulting image is displayed graphically.

* * * * *